June 3, 1924.
L. G. FISH
ELECTRIC WATER HEATER
Filed June 21, 1923
1,496,669
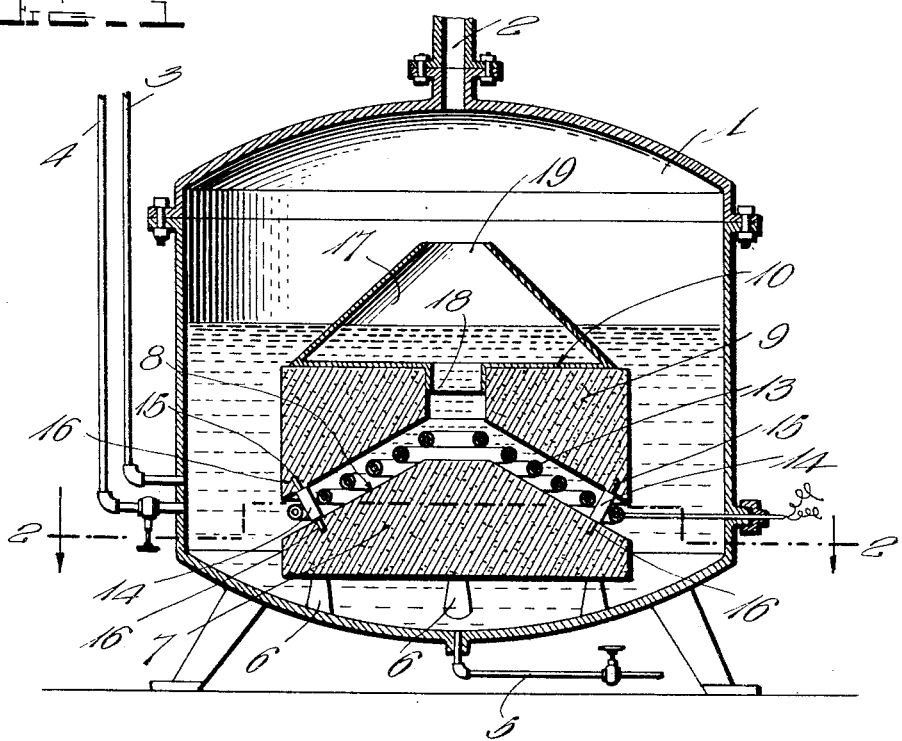
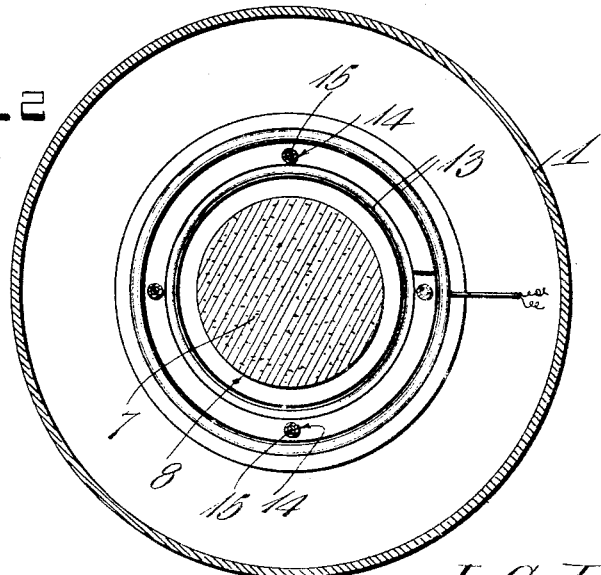
Witness
Inventor
L. G. Fish
By H. B. Willson & Co.
Attorneys Patented June 3, 1924.

1,496,669

UNITED STATES PATENT OFFICE.

LEMUEL G. FISH, OF WOONSOCKET, RHODE ISLAND.

ELECTRIC WATER HEATER.

Application filed June 21, 1923. Serial No. 646,930.

*To all whom it may concern:*

Be it known that I, LEMUEL G. FISH, a citizen of the United States, residing at Woonsocket, in the county of Providence and State of Rhode Island, have invented certain new and useful Improvements in Electric Water Heaters; and I do declare the following to be a full, clear, and exact description of the invention, such as will enable others skilled in the art to which it appertains to make and use the same.

My invention relates to improvements in water heaters and has reference more particularly to a device designed primarily for use in connection with one or more radiators for heating purposes, the object being to provide a simple and inexpensive device of this character which will quickly and economically heat the water, novel provision being made whereby the water must pass between two heated masses of stone or other desired material, at the same time coming into contact with the electric heating element which is interposed between said masses.

With the foregoing in view, the invention resides in the novel subject matter hereinafter described and claimed, the description being supplemented by the accompanying drawings:—

Figure 1 is a vertical sectional view of a heater constructed in accordance with my invention.

Fig. 2 is a horizontal sectional view on line 2—2 of Fig. 1.

I have illustrated my invention in connection with a closed tank 1 having a steam or hot water outlet 2, a return 3, a water supply pipe 4, and a drain 5. I have shown the bottom of the tank 1 provided with upstanding lugs 6 which support a flat-bottomed lower body section 7, the upper side of said section being inclined from its peripheral edge to its center as indicated at 8. Over the lower body section 7, is an upper body section 9 which preferably has a flat upper side 10 and a central opening 11 which opens through said upper side. The lower side of section 9 inclines from the peripheral edge of said section to the opening 11, the degree of inclination being preferably the same as that of the side 8 of the section 7. An electric heating element 13 of any desired form, is interposed between the two sections 7 and 9 and it will be seen that the water from the tank 1 will become heated by contact with this element and will consequently rise in the restricted space between the two sections 7 and 9, so that it discharges through the opening 11, either as hot water or steam. When the device has been in use for some time, the sections 7 and 9 become highly heated and thus they also assist in heating the water.

For spacing the body sections apart, any desired means may be employed, but I have illustrated a plurality of upstanding spacers 14 having pins 15 extending into sockets 16 in said sections.

I prefer to provide a metallic steam dome or expansion chamber 17 which may be of the frustro-conical shape illustrated, the base of this member being supported upon the surface 10 and having an inlet opening 18 communicating with the opening 11, said inlet being preferably in the form of a neck extending into said opening to hold the member 17 in place. The upper end of member 17 is provided with a suitable outlet 19 for the steam or hot water, according to the use for which the invention is employed.

When the device is used for generating steam, the dome or expansion chamber 17 muffles hissing of the steam as it leaves the generator and thus prevents undesirable noise.

Any desired material may be used in the construction of the device and at present I contemplate the use of soapstone or other suitable stone, or composition if desired, for the sections 7 and 9, and copper for the dome 17. It will be understood however, that such details may be varied as occasion may dictate.

I claim:—

1. A water heater for disposition in a tank, comprising a body having an opening through its upper end and a substantially continuous passage from the periphery of said body to said opening, and an electric heating element in said passage.

2. A water heater for disposition in a tank, comprising a body having an opening through its upper end and a substantially continuous passage from the periphery of said body to said opening, an electric heating element in said passage, and a steam retaining dome on said body communicating with said opening and having a restricted steam escape opening in its upper end.

3. A water heater for disposition in a tank, comprising a solid lower body section inclined from its peripheral edge to its center, a solid upper body section having a central opening through its upper side and having its lower side inclined from its periphery to said opening, the upper side of said lower body section and the lower side of said upper body section being disposed in closely spaced relation, and a heating element in the space between the two sections.

4. A structure as specified in claim 3; together with a steam retaining dome on said upper body section communicating with said opening and having a restricted steam escape opening.

5. A structure as specified in claim 3; together with a plurality of spacers between said upper and lower body section having projections extending into said sections.

6. A heater for disposition in a tank, said heater comprising a lower stone of conical form adapted to be supported in spaced relation with the tank bottom, the upper side of said stone being inclined from its periphery to its center, an upper stone above said lower stone having an opening formed vertically through its center, said upper stone having a flat top and having its lower side inclined from its periphery to said opening, spacers between the two stones holding their inclined sides in closely spaced relation, an electrical heater in and substantially co-extensive with the space between said stones, and a steam-retaining dome having a flat bottom resting on said upper stone and formed with an opening registering with the aforesaid opening, said steam dome having a restricted outlet in its top.

In testimony whereof I have hereunto affixed my signature.

LEMUEL G. FISH.